(12) United States Patent
Montanari et al.

(10) Patent No.: US 8,399,557 B2
(45) Date of Patent: Mar. 19, 2013

(54) BLENDS AND ALLOYS BASED ON AN AMORPHOUS TO SEMICRYSTALLINE COPOLYMER COMPRISING AMIDE UNITS AND COMPRISING ETHER UNITS, WHEREIN THESE MATERIALS HAVE IMPROVED OPTICAL PROPERTIES

(75) Inventors: Thibaut Montanari, Menneval (FR); Philippe Blondel, Bernay (FR)

(73) Assignee: Arkema France (FR)

( * ) Notice: Subject to any disclaimer, the term of this patent is extended or adjusted under 35 U.S.C. 154(b) by 138 days.

(21) Appl. No.: 12/302,660

(22) PCT Filed: Jun. 11, 2007

(86) PCT No.: PCT/FR2007/051406
§ 371 (c)(1),
(2), (4) Date: Nov. 26, 2008

(87) PCT Pub. No.: WO2007/144531
PCT Pub. Date: Dec. 21, 2007

(65) Prior Publication Data
US 2009/0318630 A1    Dec. 24, 2009

Related U.S. Application Data

(60) Provisional application No. 60/838,021, filed on Aug. 16, 2006.

(30) Foreign Application Priority Data

Jun. 14, 2006    (FR) .................................... 06 05286

(51) Int. Cl.
*C08L 77/00*    (2006.01)
*C08L 77/12*    (2006.01)

(52) U.S. Cl. ........ 524/538; 525/425; 525/430; 525/432; 525/434

(58) Field of Classification Search ................... 525/425, 525/430, 432, 434; 524/538
See application file for complete search history.

(56) References Cited

U.S. PATENT DOCUMENTS

| 2002/0063133 A1 | 5/2002 | Spickelmire et al. |
| 2003/0065107 A1 | 4/2003 | Lacroix et al. |
| 2005/0165175 A1* | 7/2005 | Montanari et al. ............. 525/419 |
| 2007/0179252 A1* | 8/2007 | Lamberts et al. ............. 525/432 |

FOREIGN PATENT DOCUMENTS
EP    0 628 602    6/1994

* cited by examiner

*Primary Examiner* — Ana Woodward
(74) *Attorney, Agent, or Firm* — RatnerPrestia (57) ABSTRACT

Transparent blend or alloy comprising, by weight, the total being 100%: (A) 1 to 99% of at least one copolymer constituent: which is amorphous or has a crystallinity ranging up to semicrystallinity; and which comprises: (A1) amide units, among which is at least one cycloaliphatic unit; (A2) flexible ether units; (B) 99 to 1% of at least one polymer constituent selected from: (Ba) semicrystalline copolyamides comprising amide units (Ba1) and comprising ether units (Ba2), (Bb) semicrystalline polyamides or copolyamides without ether units, (Bc) transparent polyamides or copolyamides without ether units, which are amorphous or weakly crystalline, and alloys based on such polyamides or copolyamides; and (C) 0 to 50% by weight of at least one polyamide, copolyamide, copolyamide comprising ether units or alloy based on such polyamides or copolyamides other than those used in (A) and (B) above. The resulting blend or alloy has a high transparency such that the transmission at 560 nm on a plate 2 mm thick is greater than 50%.

39 Claims, 1 Drawing Sheet

BLENDS AND ALLOYS BASED ON AN AMORPHOUS TO SEMICRYSTALLINE COPOLYMER COMPRISING AMIDE UNITS AND COMPRISING ETHER UNITS, WHEREIN THESE MATERIALS HAVE IMPROVED OPTICAL PROPERTIES

This application claims benefit, under U.S.C. §119 or §365 of French Application Number FR 06.05286, filed Jun. 14, 2006; U.S. 60/838,021, filed Aug. 16, 2006; and PCT/FR2007/051406 filed Jun. 11, 2007.

FIELD OF THE INVENTION

The present invention relates to novel transparent blends or alloys comprising a copolymer based on amide units and on flexible polyether units, this copolymer being amorphous or having a crystallinity ranging up to semicrystallinity.

BACKGROUND OF THE INVENTION

In order to better characterize the invention and the problem it solves, five categories of existing polyamide materials will be mentioned. The term "polyamide materials" is understood to mean compositions based on polyamides, copolyamides and alloys of polyamides or based on polyamides.

(1) Impact-Modified Polyamide Materials (High Impact PA)

These are alloys of polyamide with a minor amount of elastomer, typically in the vicinity of 20% by weight. The polyamide is typically a semicrystalline polyamide. These alloys have the advantage of a very good impact strength, much improved with respect to polyamide alone, typically three times or more better. They also have good chemical strength and satisfactory resistance to distortion under heat (60° C.). They have the disadvantage of being opaque, which can be a problem for decorative components.

(2) Transparent Amorphous Polyamide Materials (TR amPA)

These are materials which are transparent, which are amorphous or not very semicrystalline, which are rigid (flexural modulus ISO>1300 MPa) and which do not distort under heat, at 60° C., as they usually have a glass transition temperature Tg of greater than 75° C. However, they are rather unresistant to impacts, exhibiting a much lower notched Charpy ISO impact in comparison with impact-modified polyamides (typically 5 times less), and their chemical resistance is not excellent, typically due to their amorphous nature. There also exists (but these are materials less frequently encountered) transparent semicrystalline (or microcrystalline) polyamides, these materials also being fairly rigid and having a flexural modulus ISO>1000 MPa.

(3) Polyether-Block-Amide and Copolymers Comprising Ether and Amide Units (PEBA)

These are copolyamides based on ether units and on amide units: polyetheramides and in particular polyether-block-amides (PEBAs). These are very flexible impact-resistant materials but with a fairly low transparency (45 to 65% of light transmission at 560 nm for a thickness of 2 mm), just as for their polyamide homologues without ether units. The Pebax products from Arkema are an illustration thereof.

(4) Semicrystalline Polyamides (PA)

These are typically linear aliphatic polyamides. Their crystallinity is reflected by the presence of spherolites, the size of which is sufficiently great for the material not to be highly transparent (light transmission of less than 75% at 560 nm). PA11, PA12 and PA6.12 are an illustration thereof.

(5) Transparent Semicrystalline Polyamides (TR scPA)

These are more specifically microcrystalline polyamides where the size of the spherolites is sufficiently small to retain the transparency.

The various properties of the five categories of polyamides which have just been indicated have been summarized in Table A below.

Definitions of Table A:

(a) Transparency: It is characterized by the measurement of transmission at 560 nm through a polished sheet with a thickness of 2 mm.

(b) Impact/breaking strength: It is characterized by a rapid bending test or by a notched Charpy impact ISO179.

(c) Flexibility: It is characterized by the flexural modulus ISO178.

(d) Temperature stability: Ability of the polyamide not to be distorted if it is placed in a hot atmosphere, at approximately 60° C., and under the effect of a relatively great weight. For an amorphous or essentially amorphous polymer, the temperature stability becomes better as the Tg (glass transition temperature) increases and is greater than 75° C. For an essentially semicrystalline polymer, the temperature stability becomes better as the M.p. (melting point) increases and is greater than 100° C. and in particular as the enthalpy of fusion increases, this enthalpy being the reflection of the degree of crystallinity.

(e) Chemical resistance: Ability of the polyamide not to be damaged (matifying, cracking, splitting, breaking) on contact with a chemical (alcohol, and the like) and in particular if it is placed under stress, that is to say "stress cracking".

(f) Elastic fatigue: Ability of the polyamide to be bent a large number of times without breaking, elastic rebound, for example "Ross-Flex" test.

(g) Processing, ability to be injection moulded: Ability of the polyamide to be easily processed by an injection-moulding process (short cycle time, easy removal from the mould, undistorted component).

The aim of the invention is to find novel transparent compositions which are impact resistant, which are not too rigid and even up to very flexible, which behave well towards or are resistant to distortion under heat (60° C.) and/or which have good chemical resistance. The ability to resist alternating bending (fatigue) and the ability to be easily processed by injection moulding are also desired qualities. In other words, the aim has been to find a composition combining most of, or at least a larger number of, the advantages of the first three categories above (high-impact PA, TR amPA, PEBA).

The PEBA copolymers belong to the specific category of the polyetheresteramides when they result from the copolycondensation of polyamide sequences comprising reactive carboxyl ends with polyether sequences comprising reactive ends which are polyether polyols (polyether diols), the bonds between the polyamide blocks and the flexible polyether blocks being ester bonds, or alternatively to the category of the polyetheramides when the polyether sequences comprise amine ends.

Various PEBAs are known for their physical properties, such as their flexibility, their impact strength or their ease of processing by injection moulding.

The improvement in the transparency of PEBAs has already formed the subject of various research studies.

Blends between semicrystalline PEBAs have been produced but the improvement in the transparency obtained remains modest and far below 75% of transmission (at 560 nm, through a polished sheet with a thickness of 2 mm). In the case of a blend of a semicrystalline PEBA with a Tg of less than 50° C. of block-PA12/block-PTMG type with another semicrystalline PEBA with a Tg of less than 50° C. of block-PA11/block-PTMG type, the improvement in transparency reaches at best a transmission of 49%, at 560 nm over a thickness of 2 mm, which corresponds to an object which is still very markedly hazy to the eye. Blends of this type can only really be suitable for thin objects, where the haze will thus be less noticeable.

Generally, known copolymers comprising ether and amide units are composed of semicrystalline and linear aliphatic polyamide sequences (for example the "Pebax" products from Arkema).

The Applicant Company has discovered, surprisingly, that if, on the contrary, use is made of polyamide monomers of cycloaliphatic nature (and thus of nonlinear aliphatic nature), if they are copolymerized with flexible polyethers, which gives an amorphous copolymer (A), and if, subsequently, the said copolymer obtained is blended with another polyamide (B), in particular with a known semicrystalline PEBA (or other known copolymers comprising ether and amide units), transparent compositions with much improved properties are obtained. In particular, materials which are resistant to distortion under heat at 60° C. are obtained. These compositions have an improved impact strength and an improved flexibility. These compositions combine the qualities of the amorphous constituent (A), in particular its Tg, which surprisingly remains virtually unchanged, and the qualities of the semicrystalline PEBA, in particular its melting point and its enthalpy of fusion, which surprisingly remain virtually unchanged. These compositions exhibit virtually none of the failings of each of their constituents; in particular, they do not exhibit the poorer alternating flexural fatigue performance ("Rossflex") of (A) and the low transparency of (B).

In the prior state of the art, transparent blends (or alloys) of polymers were tried in order to improve the abovementioned properties. For example, EP 550 308 and EP 725 101 disclose alloys of transparent amorphous polyamide combined with a nontransparent semicrystalline polyamide, the combination giving a transparent and less rigid material. However, this material remains highly rigid (>1200 MPa of ISO flexural modulus) and has modest impact qualities (ISO notched Charpy impact of the order of 7 kJ/m$^2$, to be compared with 50 or more for a high-impact polyamide). Furthermore, its Tg has declined strongly if it is compared with that of the amorphous component alone. For example, Cristamid MS1100 from Arkema, a blend of an amorphous polyamide with a Tg of 170° C. and of 30% of semicrystalline PA12, has a Tg of 110° C. What is more, this blend almost never any more has the melting point or the enthalpy of fusion of the component PA12, even with respect to the amount of PA12 present. Another example of this type of material is Grilamid TR90LX (Ems), with a Tg far below that of its predominant component, Grilamid TR90.

Another known possibility for improving consists in blending, with the amorphous polyamide, a semicrystalline copolymer based on amide units and on ether units. However, the level of transparency obtained is much poorer than in the preceding case and it is necessary to strongly heat the blend in order to obtain an acceptable transparency. Moreover, these blends still have the disadvantage of remaining fairly rigid, in any case much more rigid than the blend of the present invention. These blends also have the disadvantage of an alternating flexural fatigue ("Rossflex") significantly inferior to that of the blends of the present invention.

If use is made, instead of the transparent amorphous polymer, of the said copolymer (A) and if it is combined with a semicrystalline polyamide, in particular with a semicrystalline copolyamide comprising ether units and comprising amide units (for example, a polyesteretheramide or a polyether-block-amide PEBA), then not only is a material obtained which is transparent and resistant to distortion under heat at 60° C. but also a material which is significantly less rigid and more impact resistant. This blend also has an improved chemical resistance in comparison with the said copolymer (A) alone and an improved elastic fatigue strength.

The problem which consists in finding novel transparent compositions which are impact resistant, which are not too rigid and even up to very flexible, which are easy to process, which have good resistance to distortion under heat (60° C.) and/or good chemical resistance and/or which have good fatigue strength can thus be solved by the use of the copolymer (A) by combining the latter in the form of blends or of alloys with other polyamides, advantageously semicrystalline polyamides, or more advantageously still their form copolymerized with ether units, in particular PEBAs.

BRIEF DESCRIPTION OF THE DRAWINGS

The single FIGURE of the appended drawing is a graph of impact (ordinate) and stiffness (abscissa) on which have been represented three novel families of advantageous compositions or materials of the invention, each combining more advantageous properties than the three existing categories of polyamide materials, namely high-impact polyamides (high-impact PA), transparent amorphous polyamides (TR amPA) and copolyamide elastomers comprising ether units (PEBA). In this graph, the three novel families of the invention are represented by the points referenced 1, 1a, 1b; 2, 2a, 2b, 2c, 2d, 2e; and 3, 3a, 3b, 3c, the copolymers (A) being illustrated by the points referenced D and M.

Figure 1:
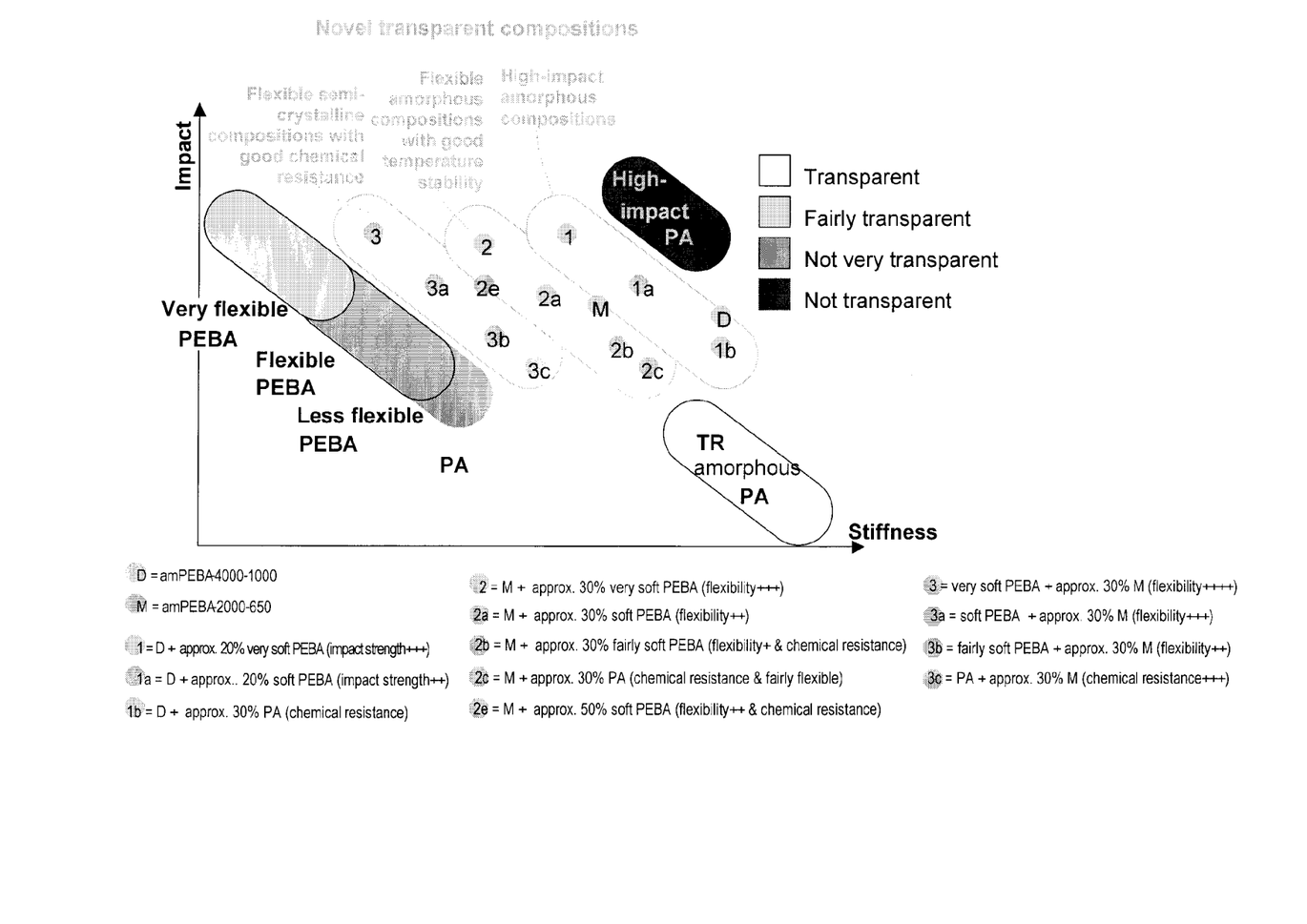

This graph thus shows the three families of transparent compositions, each exhibiting a combination of advantageous properties which are significantly distinct and thus being able to respond more specifically to a problem posed. Within the families, the compositions can be varied even more finely to optimize the profile of properties in order to respond even more specifically to a problem posed.

DESCRIPTION OF THE INVENTION

The term "problem posed" is understood to mean, of course, that properties of transparency, of impact strength, of level of flexibility, of resistance to distortion under heat or of chemical resistance are obtained but each being capable of being weighted differently in order to respond more specifically to the problem posed.

The following compositional parameters will be adjusted in order for the weighting of these desired properties to be finally adjusted:

Nature of the copolymer (A): in particular proportion of ether units and/or polyether segments as its increase increases the flexibility and the impact strength, but also nature of the polyether (hydrophilicity and other properties typical of PEBAs), and also nature of the amide units and/or polyamide segments, which makes it possible to vary the Tg and thus the temperature stability, and, finally, level of amide units, which also makes it possible to vary the Tg. The variation in these parameters also affects other properties, which makes it possible to respond more advantageously to the problem and/or to respond to other problems;

Level of copolymer (A): if this is high, the Tg will be higher, which is beneficial for the resistance to distortion under heat (60° C.);

Nature of the other ingredient or ingredients of the blend (ingredients B): ingredient B can be a very flexible PEBA, which will be beneficial for the impact strength and the flexibility; it can be a moderately flexible PEBA, which makes the blend particularly easy to prepare and results in a harmonious compromise in all the properties; it can be a fairly rigid PEBA, indeed even a polyamide, which will increase in particular the chemical resistance; it can even be a composition formed of PA which is aliphatic and semicrystalline (or microcrystalline, that is to say semicrystalline, crystalline in the form of crystalline structures, spherolites, which are sufficiently fine, thus not diffracting light and resulting in a transparent material), even predominantly of the latter, which will give a transparent material with improved impact properties; it can even be a composition formed of amorphous PA, even predominantly of the latter, which can result in properties intermediate with those of amorphous PAs, in the case where, for example, it is necessary to retain a minimum of stiffness while improving the impact strength;

Proportions of the other ingredient or ingredients of the blend (ingredients B): a high proportion of flexible PEBA improves the flexibility and the impact strength; a high proportion of semicrystalline polyamide improves the chemical resistance;

Use of the blends of the said copolymers (A): the use of a very soft copolymer and of a less soft copolymer can be advantageous in increasing the impact strength while retaining a certain level of stiffness;

Use of the blends as regards the other polyamides, copolyamides or alloys: By blending, in particular, a PEBA with a PA, this can result in an advantageous combination of high impact strength and of high chemical resistance and/or can result in a better level of transparency being obtained, in particular using a catalyzed polyamide (in particular catalyzed by phosphorus compounds, such as $H_3PO_4$, $H_3PO_3$, $H_3PO_2$);

Use of the normal additives for polyamides, such as stabilizers, colorants, plasticizers or impact modifiers, to be advantageously chosen with a similar refractive index in order to retain a high transparency.

The compositions according to the invention contribute a combination of advantages which can be summarized in Table A below.

Abbreviations:
  TR amPA: transparent and amorphous (or quasiamorphous) polyamide
  PA: semicrystalline polyamide
  TR scPA: (microcrystalline) transparent semicrystalline polyamide A subject-matter of the present invention is thus a transparent blend or alloy comprising, by weight, the total being 100%:
(A) 1 to 99% of at least one constituent copolymer:
  exhibiting a high transparency which is such that the transmission at 560 nm through a sheet with a thickness of 2 mm is greater than 65%;
  exhibiting a glass transition temperature of at least 75° C.; and
  being amorphous or exhibiting a crystallinity ranging up to semicrystallinity; and
  comprising:
    (A1) amide units, including at least one cycloaliphatic unit;
    (A2) flexible ether units;
(B) 99 to 1% of at least one constituent polymer chosen from:
  (Ba) semicrystalline copolyamides comprising amide units (Ba1) and comprising ether units (Ba2) having a glass transition temperature (Tg) of less than 75° C.;
  (Bb) semicrystalline polyamides or copolyamides without ether units having a melting point (M.p.) of greater than 100° C.;
  (Bc) transparent polyamides or copolyamides without ether units having a glass transition temperature (Tg) of greater than 75° C. and being amorphous or weakly crystalline having an enthalpy of fusion during the second heating of an ISO DSC (delta Hm(2)) of less than 25 J/g, the weight being with respect to the amount of amide units present or of polyamide present, this melting corresponding to that of the amide units; and alloys based on such polyamides or copolyamides; and
(C) 0 to 50% by weight of at least one polyamide, copolyamide, copolyamide comprising ether units or alloy based on such polyamides or copolyamides other than those used in (A) and (B) above; and/or of at least one additive normal for thermoplastic polymers and copolymers;
the choice of the units or monomers participating in the composition of (A), (B) and (C) and also the choice of the proportions of the said units or of the said monomers being such that the resulting blend or alloy exhibits a high transparency such that the transmission at 560 nm through a sheet with a thickness of 2 mm is greater than 50%.

The constituent copolymer (A) can be amorphous. It can also be quasiamorphous, having a crystallinity such that the enthalpy of fusion during the second heating of an ISO DSC (delta Hm(2)) is less than or equal to 10 J/g, the weight being with respect to the amount of amide units present or of polyamide present, this melting being that of the amide units; finally, it can have a crystallinity (referred to as intermediate crystallinity) such that the enthalpy of fusion during the second heating of an ISO DSC (delta Hm(2)) is between 10 and

TABLE A

| Polyamide category | Transparency (a) | Impact/breaking strength (b) | Flexibility (c) | Temperature stability (d) | Chemical resistance (e) | Elastic fatigue (f) | Processing (g) |
|---|---|---|---|---|---|---|---|
| (1) High-impact PA | --- | +++ | + | ++ | +++ | + | +++ |
| (2) TR amPA | +++ | − | − to --- | ++ to +++ | − to --- | -- to + | − |
| (3) PEBA | -- to + | + to +++ | + to +++ | + to ++ | + to ++ | +++ | ++ to +++ |
| (4) PA | -- to − | + | + | ++ | +++ | + | +++ |
| (5) TR scPA | ++ to +++ | + | − to + | − to + | + to +++ | − to + | − |
| Present invention | ++ to +++ | + to +++ | + to +++ | + to ++ | + to ++ | − to ++ | ++ |

Grades from --- = very bad to +++ = very good

30 J/g, preferably between 10 and 25 J/g, the weight being with respect to the amount of amide units present or of polyamide present, this melting being that of the amide units. Such materials are products with behaviour intermediate between amorphous or essentially amorphous polymers, that is to say with an enthalpy of fusion at the second heating between 0 and 10 J/g, which are no longer in the solid state above their Tg, and truly semicrystalline polymers, which are polymers which remain in the solid state and thus which definitely retain their shape above their Tg. These products with intermediate behaviour are thus in a more or less solid state but can be easily deformed above their Tg. As their Tg is high, in so far as they are not used above this Tg, such materials are advantageous, all the more so as their chemical resistance is better than that of the amorphous materials.

The term "delta Hm(2)" is understood to mean the enthalpy of fusion during the second heating of a DSC according to the ISO standard, DSC being Differential Scanning Calorimetry.

The constituent copolymer (A) can exhibit a glass transition temperature (Tg) at least equal to 90° C.

The constituent copolymer (A) can also exhibit a transparency which is such that the transmission at 560 nm through a sheet with a thickness of 2 mm is greater than 75%.

The constituent copolymer (A) comprising amide units (A1) and comprising ether units (A2) can be provided in the form of polyamide-polyether blocks.

The units (A1) can be composed predominantly of an equimolar combination of at least one diamine and of at least one dicarboxylic acid, the diamine or diamines being predominantly cycloaliphatic and the dicarboxylic acid or acids being predominantly linear aliphatic, it being possible for the amide units optionally to comprise, but to a minor extent, at least one other polyamide comonomer. The term "predominantly" is understood to mean "in a proportion of more than 50% by weight (>50%)". The expression "to a minor extent" is understood to mean "in a proportion of less than 50% by weight (<50%)".

The cycloaliphatic diamine or diamines can advantageously be chosen from bis(3-methyl-4-aminocyclohexyl)methane (BMACM), para-aminodicyclohexylmethane (PACM), isophoronediamine (IPD), bis(4-aminocyclohexyl)methane (BACM), 2,2-bis(3-methyl-4-aminocyclohexyl)propane (BMACP) or 2,6-bis(aminomethyl)norbornane (BAMN).

Advantageously, just one cycloaliphatic diamine, in particular bis(3-methyl-4-aminocyclohexyl)methane, was used as diamine to produce the amide units (A1).

At least one noncycloaliphatic diamine can participate in the composition of the monomers of the amide units (A1), in a proportion of at most 30 mol % with respect to the diamines of the said composition. Mention may be made, as noncycloaliphatic diamine, of linear aliphatic diamines, such as 1,4-tetramethylenediamine, 1,6-hexamethylenediamine, 1,9-nonamethylenediamine and 1,10-decamethylenediamine.

The aliphatic dicarboxylic acid or acids can be chosen from aliphatic dicarboxylic acids having from 6 to 36 carbon atoms, preferably from 9 to 18 carbon atoms, in particular 1,10-decanedicarboxylic acid (sebacic acid), 1,12-dodecanedicarboxylic acid, 1,14-tetradecanedicarboxylic acid and 1,18-octadecanedicarboxylic acid.

At least one nonaliphatic dicarboxylic acid can participate in the composition of the monomers of the amide units in a proportion of at most 15 mol % with respect to the dicarboxylic acids of the said composition. Preferably, the nonaliphatic dicarboxylic acid is chosen from aromatic diacids, in particular isophthalic acid (I), terephthalic acid (T) and their mixtures.

The monomer or monomers participating to a minor extent in the composition of the monomers of the amide units (A1) can be chosen from lactams and α,ω-aminocarboxylic acids.

The lactam is, for example, chosen from caprolactam, oenantholactam and lauryllactam.

The α,ω-aminocarboxylic acid is, for example, chosen from aminocaproic acid, 7-aminoheptanoic acid, 11-aminoundecanoic acid or 12-aminododecanoic acid.

Advantageously, the constituent copolymer (A) includes amide units (A1) for which the number of carbons per amide is on average at least equal to 9.

The polyamide blocks are, for example, chosen from BMACM.6, BMACM.9, BMACM.10, BMACM.12, BMACM.14, BMACM.16, BMACM.18 and their blends.

The number-average molecular weight of the polyamide blocks is advantageously between 500 and 12 000 g/mol, preferably between 2000 and 6000 g/mol.

The ether units (A2) result, for example, from at least one polyalkylene ether polyol, in particular a polyalkylene ether diol, preferably chosen from polyethylene glycol (PEG), polypropylene glycol (PPG), polytrimethylene glycol (PO3G), polytetramethylene glycol (PTMG) and their blends or their copolymers.

The flexible polyether blocks can comprise polyoxyalkylene sequences comprising $NH_2$ chain ends, it being possible for such sequences to be obtained by cyanoacetylation of α,ω-dihydroxylated aliphatic polyoxyalkylene sequences, referred to as polyether diols. More particularly, use may be made of Jeffamines (for example Jeffamine® D400, D2000, ED 2003 or XTJ 542, commercial products from Huntsman. See also Patents JP 2004346274, JP 2004352794 and EP 1 482 011).

The number-average molecular weight of the polyether blocks is advantageously between 200 and 4000 g/mol, preferably between 300 and 1100 g/mol.

The copolymer (A) can be prepared by the following process, in which:
in a first stage, the polyamide blocks PA are prepared by polycondensation
of the diamine or diamines;
of the dicarboxylic acid or acids; and
if appropriate of the comonomer or comonomers chosen from lactams and α,ω-aminocarboxylic acids;
in the presence of a chain-limiting agent chosen from dicarboxylic acids; then
in a second stage, the polyamide blocks PA obtained are reacted with polyether blocks PE in the presence of a catalyst.

The general method for the two-stage preparation of the copolymers of the invention is known and is disclosed, for example, in French Patent FR 2 846 332 and European Patent EP 1 482 011.

The reaction for the formation of the PA block is usually carried out between 180 and 300° C., preferably from 200 to 290° C., the pressure in the reactor is established between 5 and 30 bar and is maintained for approximately 2 to 3 hours. The pressure is slowly reduced by bringing the reactor to atmospheric pressure and then the excess water is distilled off, for example over one or two hours.

The polyamide comprising carboxylic acid ends having been prepared, the polyether and a catalyst are subsequently added. The polyether can be added on one or more occasions, and likewise for the catalyst. According to an advantageous form, first of all the polyether is added and the reaction of the OH ends of the polyether and of the COOH ends of the polyamide begins with formation of ester bonds and removal of water. As much as possible of the water is removed from the reaction medium by distillation and then the catalyst is introduced in order to bring to completion the bonding of the polyamide blocks and of the polyether blocks. This second stage is carried out with stirring, preferably under a vacuum of at least 15 mmHg (2000 Pa), at a temperature such that the reactants and the copolymers obtained are in the molten state. By way of example, this temperature can be between 100 and 400° C. and generally 200 and 300° C. The reaction is monitored by measuring the torsional couple exerted by the molten polymer on the stirrer or by measuring the electrical power consumed by the stirrer. The end of the reaction is determined by the target value of the couple or of the power.

It can also be possible to add, during the synthesis, at the moment judged as the most opportune, one or more molecules used as antioxidant, for example Irganox® 1010 or Irganox® 245.

It is also possible to consider the process for the preparation of the copolymer (A) such that all the monomers are added at the start, i.e. in a single stage, to carry out the polycondensation:
- of the diamine or diamines;
- of the dicarboxylic acid or acids; and
- if appropriate, of the other polyamide comonomer or comonomers;
- in the presence of a chain-limiting agent chosen from dicarboxylic acids;
- in the presence of the PE (polyether) blocks;
- in the presence of a catalyst for the reaction between the flexible PE blocks and the PA blocks.

Advantageously, the said dicarboxylic acid, which is introduced in excess with respect to the stoichiometry of the diamine or diamines, is used as chain-limiting agent.

Advantageously, a derivative of a metal chosen from the group formed by titanium, zirconium and hafnium or a strong acid, such as phosphoric acid, hypophosphorous acid or boric acid, is used as catalyst.

The polycondensation can be carried out at a temperature of 240 to 280° C.

The choice can also be made of a copolymer (A) for which the flexible ether units are chosen to be of highly hydrophilic nature, preferably of polyether block of PEG, PPG or PO3G type nature, which confers an advantageous increase in antistatic and waterproof-breathable properties on the composition (that is to say, allowing the passage of water vapour but not of liquid water). Furthermore, this composition can be additivated by third-party antistatic additives, in order to reinforce the overall antistatic effect, and also by additives which make it possible to increase the blending compatibility with other polymers. The copolymer (A), alone or thus additivated, confers an increase in antistatic or waterproof-breathable properties on the blend or on the alloy of the present invention.

The polymer (B) can be a semicrystalline copolyamide (Ba) having a melting point of greater than 100° C., preferably greater than 150° C., and a glass transition temperature (Tg) of less than 65° C. and comprising:
(Ba1) aliphatic or predominantly aliphatic amide units;
(Ba2) ether units.

The copolyamide (Ba) comprising amide units (Ba1) and comprising ether units (Ba2) can advantageously be provided in the form of polyamide-polyether blocks.

The amide units (Ba1) can be composed predominantly of a lactam or of an α,ω-aminocarboxylic acid and/or of an equimolar combination of at least one diamine and of at least one dicarboxylic acid, the diamine or diamines being predominantly linear aliphatic diamines, it being possible for the amide units optionally to comprise, but to a minor extent, at least one other polyamide comonomer.

The constituent copolymer (B) can advantageously include amide units (Ba1) of linear aliphatic nature for which the number of carbons per amide is on average at least equal to 9.

The abovementioned linear aliphatic polyamide blocks can be chosen from PA 12, PA 11, PA 10.10, PA 10.12, PA 10.14, PA 6.10, PA 6.12, PA 6.14 and PA 6.18, being chosen in particular from PA 10.10, PA 10.12, PA 10.14, PA 6.10, PA 6.12, PA 6.14 and PA 6.18.

The ether units (Ba2) can be chosen from those indicated above for the ether units (A2), advantageously being of the same nature and of a similar size or weight as the ether units (A2) of the said blend or alloy.

The copolymer (Ba) can have in particular a crystallinity such that the enthalpy of fusion during the second heating of an ISO DSC (delta Hm(2)) is at least equal to 25 J/g, the weight being with respect to the amount of amide units present or of polyamide present, this melting corresponding to that of the amide units.

Advantageously, the amide units (A1) represent at least 50% by weight of the said constituent copolymer (A) and the amide units (Ba1) represent at least 50% by weight of the copolyamide (Ba).

Advantageously, the ether units (A2) represent at least 15% by weight of the said constituent copolymer (A) and the units (Ba2) represent at least 15% by weight of (Ba).

The semicrystalline polyamides and copolyamides (Bb) have in particular a melting point (M.p.) of greater than 150° C.

They can be chosen from PA12 and PA11. They can also be chosen from PA10.10, PA10.12, PA10.14, PA6.10, PA6.12, PA6.14 and PA6.18.

The transparent amorphous or quasiamorphous polyamides (Bc) can be chosen from polyamides of BMACM.12, BMACM.14, PACM.12, IPD.12, BMACM.12/12 type and more generally from polyamides based on diamines BMACM, PACM, IPD and on C14, C12, C10 dicarboxylic acid, their copolymers or blends.

The constituent polymer (B) can be composed essentially of:
transparent amorphous polyamides or copolyamides and semicrystalline polyamides or copolyamides, in particular alloys of polyamides BMACM.12, PACM.12, IPD.12 or of their copolyamides with PA12;
transparent amorphous polyamides or copolyamides and semicrystalline copolyamides with ether units;
semicrystalline polyamides or copolyamides and semicrystalline copolyamides with ether units.

The usual additive or additives can be chosen from colorants, stabilizers, such as heat stabilizers and UV stabilizers, nucleating agents, plasticizers, agents for improving the impact strength and reinforcing agents, the said additive or additives preferably having a refractive index similar to that of the copolymer (A), (B) or optionally (C).

The nature and the proportions of (A) and (B) and, if appropriate, of a constituent polymer (C) can be such that the resulting composition is amorphous and has a glass transition temperature of greater than 75° C.

Equally, the nature and the proportions of (A) and (B) and, if appropriate, of a constituent polymer of (C) can be such that the resulting composition is semicrystalline, with a melting point M.p. of greater than 100° C., preferably of greater than 150° C., and with an enthalpy of fusion during the second heating of an ISO DSC (delta Hm(2)) of greater than 10 J/g, preferably than 25 J/g, the weight being with respect to the amount of amide units present or of polyamide present, in order to guarantee sufficient crystallinity to remain in a sufficiently solid state above the glass transition temperature (Tg) and to liquefy only above its melting point M.p.

Furthermore, advantageously, the choice of the units or monomers participating in the composition of (A), (B) and (C) as well as the choice of the proportions of the said units or of the said monomers are such that the resulting blend or alloy exhibits a high transparency such that the transmission at 560 nm through a sheet with a thickness of 2 mm is greater than 75%.

In accordance with a particularly advantageous characteristic of the blend or alloy according to the present invention in (A) or (Ba), preferably in (A) and (Ba), the flexible ether units are chosen to be of highly hydrophilic nature, preferably of polyether block of PEG or its copolymers with PPG or PO3G type nature, which confers antistatic properties and waterproof-breathable properties, that is to say allowing the passage of water vapour but not of liquid water, on the said blend or alloy, it furthermore being possible for this blend or alloy to be additivated by third-party antistatic additives, in order to reinforce the overall antistatic effect, and by additives which make it possible to increase the blending compatibility with other polymers, it being possible for the blend or alloy, alone or thus additivated, subsequently to be specifically used as additive of another polymer or material in order to confer on it an increase in antistatic or waterproof-breathable properties.

In particular, the additivated blend or alloy can advantageously be transparent, it being possible for the ingredients of the said blend or alloy to be chosen so that the refractive index of the latter is very close to that of the polymer or material to be additivated.

To prepare the blends or alloys according to the invention, the constituents (A), (B) and if appropriate (C), which are in the form of granules, can be blended, this blend subsequently being injection moulded at a temperature of between 230 and 330° C. on an injection-moulding machine in order to obtain the desired objects and test specimens.

The constituents (A), (B) and if appropriate (C) can also be blended in the molten state, in particular in an extruder, at a temperature of between 230 and 330° C., and they are recovered in the form of granules, which granules will subsequently be injection moulded at a temperature of between 230 and 330° C. on an injection-moulding machine in order to obtain the desired objects and test specimens.

In the case where the blend or alloy comprises additives with the constituent (Ba), the process advantageously comprises the following stages:
- in a first stage, the constituent (Ba) is blended in the molten state with the said additives, in particular in an extruder, the composition then being recovered in the form of granules;
- in a second stage, the composition obtained in the first stage is blended with granules of the constituent polymer (A).

Another subject-matter of the present invention is a shaped article, in particular a transparent or translucent shaped article, such as fibre, fabric, film, sheet, rod, pipe or injection-moulded component, comprising the blend or alloy as defined above, which can be produced in the form of a dry blend or after a compounding in an extruder.

Thus, the blend or alloy according to the present invention is advantageous in the ready manufacture of articles, in particular of sports equipment or components of sports equipment, which have in particular to simultaneously exhibit good transparency, good impact strength and good endurance with regard to mechanical assaults and attacks by chemicals, UV radiation and heat. Mention may be made, among this sports equipment, of components of sports shoes, sports gear, such as ice skates or other winter and mountaineering sports equipment, ski bindings, rackets, sports bats, boards, horseshoes, flippers, golf balls or recreational vehicles, in particular those intended for cold-weather activities.

Mention may also be made generally of recreational equipment, do-it-yourself equipment, highway gear and equipment subjected to attacks by the weather and to mechanical assaults, or protective articles, such as helmet visors, glasses and sides of glasses. Mention may also be made, as nonlimiting examples, of motor vehicle components, such as headlight protectors, rearview mirrors, small components of all-terrain motor vehicles, tanks, in particular for mopeds, motorbikes or scooters, subjected to mechanical assaults and attacks by chemicals, PMMA screws and bolts, cosmetic articles subjected to mechanical assaults and attacks by chemicals, lipstick tubes, pressure gauges or attractive protective components, such as gas bottles.

The examples which follow illustrate the present invention without, however, limiting the scope thereof.

EXAMPLES

In the Ref. Examples, Comparative Examples and Tests below, the percentages are by weight, unless otherwise indicated, and the abbreviations used are as follows:

BMACM: 3,3'-dimethyl-4,4'-diaminodicyclohexylmethane

PACM: 4,4'-diaminodicyclohexylmethane, which is found with variable ratios of isomers; it is thus possible to distinguish "PACM20" from Air Products and PACM richer in trans-trans isomer, Dicycan from BASF, which comprises more than 45% of trans-trans isomer and which will be referred to as "PACM45"

TA: terephthalic acid (dicarboxylic acid)

IA: isophthalic acid (dicarboxylic acid)

LA12: lactam 12

C14: tetradecanedioic acid (dicarboxylic acid)

C12: dodecanedioic acid (dicarboxylic acid)

C10: sebacic acid (dicarboxylic acid)

PTMG: a polyether, namely polytetramethylene glycol

PTMG 650: PTMG with a weight of 650 grams

PTMG 1000: PTMG with a weight of 1000 grams

PEBA 12/PTMG 2000/1000 is a copolymer comprising blocks of polyamide 12 with a weight of 2000 g and comprising flexible blocks of PTMG polyether with a weight of 1000 g.

PEBA 12/PTMG 4000/1000 is a copolymer comprising blocks of polyamide 12 with a weight of 4000 g and comprising flexible blocks of PTMG polyether with a weight of 1000 g.

PEBA 12/PTMG 5000/650 is a copolymer comprising blocks of polyamide 12 with a weight of 5000 g and comprising flexible blocks of PTMG polyether with a weight of 650 g.

PEBA 11/PTMG 5000/650 is a copolymer comprising blocks of polyamide 11 with a weight of 5000 g and comprising flexible blocks of PTMG polyether with a weight of 650 g.

PEBA 12/PEG 4500/1500 is a copolymer comprising blocks of polyamide 12 with a weight of 4500 g and comprising flexible blocks of PEG polyether with a weight of 1500 g.

PA11 BESHV0: polyamide 11 from Arkema with a weight-average molecular weight of between 45 000 and 50 000 gram/mol.

PA12 AESNO: polyamide 12 with a weight-average molecular weight of between 45 000 and 50 000 gram/mol.

BMACM. TA/BMACM. IA/LA12: amorphous polyamide with a Tg of 170° C. and with a molar composition: 1 BMACM; 0.7 TA; 0.3 IA; 1 LA12.

PEG: polyethylene glycol

PE: polyether

In the case of diacid mixture, their proportions are indicated in moles.

Definitions of the Tables Below:

Rise in viscosity: It represents the ability to be polymerized and consequently to produce a polymer of sufficient weight and thus of sufficient viscosity, which is reflected by an increase in the couple or in the power of the stirrer motor of the polymerizer. This rise in viscosity is produced under nitrogen or under vacuum. This rise in viscosity may be possible (recorded as "yes" in the tables which follow) or may not be possible (recorded as "no" in the tables which follow).

Tg: Inflection point at the second pass by DSC (DSC=Differential Scanning Calorimetry)

Tg: glass transition temperature measured according to a DMA. It is the temperature given by the peak of the tangent delta Transparency: it is characterized by a measurement of light transmission at a wavelength of 560 nm through a polished sheet with a thickness of 2 mm. An amount of light transmitted expressed as percent is measured.

Opacity—transparency: It corresponds to the contrast ratio and percentage of light transmitted or reflected at the wavelength of 560 nm on a sheet with a thickness of 2 mm.

Flexural modulus: Either according to ISO (MPa) on 80×10×4 mm bars or E' modulus obtained at 23° C. obtained during a DMA measurement.

Elasticity: coefficient α (alpha): determined graphically during an analysis of responsiveness: amplitude as a function of time. The higher the value, the more responsive and elastic the material.

Fatigue: Ross-Flex test ASTM 1052. A flat test specimen with a thickness of 2 mm, pierced by a hole with a diameter of 2.5 mm, is bent, at the level of this hole, by 90° alternatively, at −10° C., the aim being to withstand the greatest possible number of cycles without breaking.

Temperature stability: Ability of the polyamide not to be distorted if it is placed in a hot atmosphere, at approximately 60° C., and under the effect of a relatively great weight. For an amorphous or essentially amorphous polymer, the temperature stability becomes better as the Tg (glass transition temperature) increases and is greater than 75° C. For an essentially semicrystalline polymer, the temperature stability becomes better as the M.p. (melting point) increases and is greater than 100° C., and in particular as the enthalpy of fusion increases, this enthalpy being the reflection of the degree of crystallinity.

Elongation at break (%): Tension with regard to ISOR527

Viscosity: Intrinsic viscosity in dl/g from 0.5 g dissolved at 25° C. in metacresol Yellowing: it involves a measurement of Yellow Index (YI) on granules Antistatic effect: The antistatic effect is characterized by a measurement of surface resistivity (ohms) according to ASTM D257 at 20° C. at a relative humidity of 65% under a continuous voltage of 100 V.

Waterproofness-breathability or permeability to water vapour: It is estimated according to Standard ASTM 96 E BW at 38° C. and 50% relative humidity on a film with a thickness of 25 μm.

M.p.: melting point measurement according to an ISO DSC, during the 2nd heating.

C.t.: crystallization temperature measurement according to an ISO DSC, during the cooling stage.

DSC: Differential Scanning Calorimetry, ISO 11357.

DMA: Dynamic Mechanical Analysis, ISO 6721.

Chemical resistance test (ESC ethanol). Dumbbells with a thickness of 2 mm are bent by 180° and are immersed in increasingly concentrated aqueous ethanol solutions. The ethanol concentration is expressed as %. It is observed whether the dumbbell has broken or split. The most concentrated solution which has not resulted in breaking or splitting is selected as criterion. The higher the figure, the better the material.

Test of ability to be injection moulded. The compositions are injection moulded in a spiral mould with a thickness of 2 mm at a given pressure of 1200 bar. The length which the mould material was able to fill is subsequently measured (in mm).

Notched Charpy impact test. It is carried out on notched bars according to Standard ISO179.

Semicrystalline: a semicrystalline polymer, in particular a polyamide, is a polymer which has a melting point with a significant enthalpy of fusion, of greater than 10 J/g, preferably of greater than 25 J/g (measurement carried out during an ISO DSC, during the second heating), which means that the polymer retains an essentially solid state above its glass transition temperature (Tg).

Amorphous: an amorphous polymer, in particular a polyamide, is a polymer which does not have a melting point or which has a not very marked melting point, that is to say with an enthalpy of fusion of less than 10 J/g, measurement carried out during an ISO DSC, during the second heating. This polymer thus leaves its solid state above its glass transition temperature Tg.

Examples of (A)+(B) Binary Blends According to the Invention

Preparation of the Copolymer (A), Tests 1 to 7

Procedure: These are 2nd stage tests. PEBAs were prepared from PA blocks based on cycloaliphatic diamine according to the following procedure: the cycloaliphatic diamine and the diacids are charged to an 80 l autoclave. The reactor is purged with nitrogen and closed, and is heated to 260° C. under pressure and while stirring at 40 rev/min. After maintaining for one hour, the pressure is reduced to atmospheric pressure and the polyether and the catalyst are added. The reactor is placed under vacuum over 30 min to reach 50 mbar (if necessary 20 mbar). The rise in the couple lasts approximately two hours. On reaching the viscosity, the reactor is brought back to atmospheric pressure and the product is granulated and dried under vacuum at 75° C.

Test 5

The following are charged for the 1st stage

BMACM: 16.446 kg

C10 acid (sebacic acid): 15.085 kg

Water: 0.5 kg

Then, for the 2nd stage, 3.51 kg of PTMG 650 and 45.5 g of catalyst [zirconium butoxide: Zr(OBu)4] are added.

In Table 1 below, the PACM 45 corresponds to a PACM with more than 45% of trans-trans isomer and Ref. 2 is a product which has a melting point of 229° C. and an enthalpy of 26 J/g.

Table 2 corresponds to blends of semicrystalline PEBAs (Ba). It is found that the transparency is never >50%.

Table 3 corresponds to blends of transparent amorphous PAs and of semicrystalline PEBAs (Ba). The amorphous polyamide is cycloaliphatic and comprises similar polyamide units to the said copolymer (A). The PEBA is the same as in the examples mentioned below. The transparency of the blends between semicrystalline PEBA and amorphous PA is far below 75% and the fatigue behaviour is much poorer than that of the PEBA.

Table 4 corresponds to blends of transparent amorphous PAs and of semicrystalline PAs. The BMACM.TA/BMAC-M.IA/LA12 is an amorphous polyamide with the molar composition: 1 mol BMACM; 0.7 mol TA; 0.3 mol IA; 1 mol LA12. It will be shown that a semicrystalline PA renders the composition transparent but lowers its Tg; for this reason, the HDT, mechanical strength under hot conditions, will be reduced in proportion.

Table 5 corresponds to blends of (A) and of semicrystalline PEBAs (Ba). The DMA shows that, with respect to Comparative 12 (unlike the blends in Table 4, Comp. 10 & 11), there is no significant fall in the Tg or in the M.p. and in its enthalpy, the latter being with respect to the amount of PA12 (semicrystalline). The temperature stability is thus retained extremely well. Compared with PEBAs lying within the same range of flexibility (E' modulus), much better transparencies are obtained. These examples are injection moulded very easily (no defects on the component). The moulding is carried out at 275° C.

Table 6 corresponds to blends of (A) and of semicrystalline PAs (Bb). It is also possible to have a markedly improved transparency by putting very little of the said copolymer (A) in a semicrystalline PA. In comparison with (A) alone, the chemical resistance is improved. The moulding is carried out at 295° C.

Table 7 corresponds to blends of (A) and of semicrystalline PEBAs (Ba). The moulding is carried out at 280° C.

Table 8 corresponds to an antistatic and waterproof-breathable blend.

The copolymer Test 3 is distinguished essentially from the amorphous homopolyamide BMACM.14 (Comparative 7) by the presence of polyether comonomer. It is surprising to find that it then becomes possible to obtain the transparency by blending it with the nontransparent flexible semicrystalline PEBA (Examples 1 to 3), which contrasts with the transparency results obtained with the comparative blends (Comp. 6 and 6b). It thus becomes possible to reconcile the transparency and the impact properties and the fatigue behaviour of the flexible PEBAs.

It is also surprising to find that our compositions make it possible to retain a high Tg (Examples 1 to 3 with a Tg of 95° C., compared with their Comparative 12 control with a Tg of 95° C.), unlike the known blends (Comparative 10 with a Tg of 115° C., compared with its Comparative 7 control with a Tg of 141° C.). The temperature stability is better retained.

Examples of (A)+(B)+(C) Ternary Blends According to the Invention

The ternary blends make possible certain optimizations. It is possible to improve the chemical resistance even more by addition of semicrystalline polyamide and to improve the impact and elastic properties with the addition of PEBA. A ternary blend is then present. Table 9 corresponds to a ternary blend.

Another advantageous ternary combination is the joint use of a transparent amorphous polyamide and of the said copolymer (A) to render transparent a nontransparent semicrystalline polyamide (which can be done by either of the two ingredients, the transparent amorphous PA and the said copolymer A), the final composition having to have a satisfactory impact strength (which the said copolymer (A) contributes) but without becoming excessively flexible (the rigid transparent amorphous polyamide BMACM.14 compensating for the flexibilizing due to the presence of the said copolymer (A)).

TABLE 1

Tests 1 to 7 and Ref. 1 et 2 (copolymer (A))

| Reference | Stages | Diamine (of the PA) | Diacid (of the PA) | PE | % PE | Mn of the PA | Mn of the PE | Rise in viscosity | Tg (° C.) | Delta Hm (2) | Transmission at 560 nm |
|---|---|---|---|---|---|---|---|---|---|---|---|
| Ref. 1 | 1 | BMACM | C14 | | 0 | | 0 | | 144 | 0 | 91 |
| Ref. 2 | 1 | PACM45 | C14 | | 0 | | 0 | | 120 | 26 | 90 |
| Test 1 | 2 | BMACM | C10 (0.5) C12 (0.5) | PTMG | 12 | 5000 | 650 | OK | 131 | 0 | 90 |
| Test 2 | 2 | BMACM | C14 | PTMG | 12 | 5000 | 650 | OK | 108 | 0 | 92 |
| Test 3 | 2 | BMACM | C12 (0.5)-C14 (0.5) | PTMG | 25 | 2000 | 650 | OK | 91 | 0 | 91 |
| Test 4 | 2 | BMACM | C12 (0.5)-C14 (0.5) | PTMG | 20 | 4000 | 1000 | OK | 112 | 0 | 86 |
| Test 5 | 2 | BMACM | C10 | PTMG | 12 | 5000 | 650 | | 131 | 4 | 86 |
| Test 6 | 2 | PACM 45 | C14 | PTMG | 12 | 5000 | 650 | OK | 102 | 22 | 77 |
| Test 7 | 2 | BMACM | C14 (0.5)-C18 (0.5) | PEG | 23 | 5000 | 1500 | OK | 85 | 0 | 76 |

| Reference | MFI | Opacity | Flexural modulus (MPa) | α (alpha) | Ross-Flex | Elongation at break (%) | Yield stress (MPa) | Viscosity | Yellowing |
|---|---|---|---|---|---|---|---|---|---|
| Ref. 1 | 6.5 | 12.4 | 1382 | 7.5 | <10000 | 190 | 51 | 1.17 | |
| Ref. 2 | 20 | | | | | | | 1.13 | |
| Test 1 | 11 | 9.6 | 1377 | 8.9 | | 221 | 48 | 1.21 | |
| Test 2 | | | 1190 | | | 260 | 43 | 1.11 | 13.7 |
| Test 3 | | | 680 | | 50000 | | | 1.21 | 8.7 |
| Test 4 | | | 970 | | | 290 | 35 | 1.21 | 0.25 |
| Test 5 | 13 | 10.6 | 1455 | 10.2 | | 202 | 50 | 1.18 | |
| Test 6 | 10 | | 1180 | | | | | 1.15 | |
| Test 7 | | | | | | | | | |

TABLE 2

Comparative Examples 1 to 3, 1b and 1c
(Blends of semicrystalline PEBAs (Ba))

|  | Comparative 1b | Comparative 1 | Comparative 2 | Comparative 3 | Comparative 1c |
|---|---|---|---|---|---|
| Composition |  |  |  |  |  |
| A = PA12/PTMG: 5000/650 | 100 | 70 | 50 | 30 |  |
| B = PA11/PTMG: 5000/650 |  | 30 | 50 | 70 | 100 |
| Properties |  |  |  |  |  |
| Transparency (560 nm, 2 mm) | 23 | 44 | 49 | 49 | 44 |

TABLE 3

Comparative Examples 4 to 6 and 6b (Blends of transparent
amorphous PAs and of semicrystalline PEBAs (Ba))

|  | Comparative 4 | Comparative 5 | Comparative 6 | Comparative 6b |
|---|---|---|---|---|
| Composition |  |  |  |  |
| Ref. 1 | 100 | 0 | 70 | 30 |
| PEBA 12/PTMG (2000/1000) | 0 | 100 | 30 | 70 |
| Properties |  |  |  |  |
| Transparency at 560 nm over a thickness of 2 mm | 91 | 39 | 62 | 40 |
| Ross-Flex fatigue behaviour (cycles) | ≦5000 | >50 000 | ≦10 000 |  |

TABLE 4

Comparative Examples 7 to 11
(Blends of transparent amorphous PAs and of semicrystalline PAs)

|  | Comparative 7 | Comparative 8 | Comparative 9 | Comparative 10 | Comparative 11 |
|---|---|---|---|---|---|
| Composition |  |  |  |  |  |
| Ref. 1 | 100 |  |  | 80 |  |
| BMACM.TA/BMACM.IA/LA12 |  | 100 |  |  | 70 |
| Properties |  |  |  |  |  |
| PA12 AESNO |  |  | 100 | 20 | 30 |
| M.p. | without | without | 178 | Virtually without (enthalpy <10 J/g) | Virtually without (enthalpy <10 J/g) |
| Tg | 141 | 170 | 54 | 115 | 120 |
| Transparency at 560 nm over a thickness of 2 mm | 91 | 90 | 10 | 90 | 90 |

TABLE 5

Examples 1 to 3, Comparative Examples 1b, 5 and 12
(Blends of (A) and of semicrystalline PEBAs (Ba))

|  | Comparative 12 | Example 1 | Example 2 | Example 3 | Comparative 5 | Comparative 1b |
|---|---|---|---|---|---|---|
| Composition |  |  |  |  |  |  |
| Test 3 | 100 | 70 | 50 | 30 | 0 | 0 |
| PEBA 12/PTMG 2000/1000 | 0 | 30 | 50 | 70 | 100 |  |
| PEBA 12/PTMG 5000/650 |  |  |  |  |  | 100 |
| Properties |  |  |  |  |  |  |
| Transparency at 560 nm over a thickness of 2 mm | 91 | 88 | 84.5 | 77 | 39 | 44 |
| M.p. (by DSC) | without | 163 | 163 | 163 | 163 |  |
| Enthalpy in J/g (reflection of the temperature stability), with respect to the weight of PA12 (by DSC) | 0 |  | 60 | 62 | 61 |  |

TABLE 5-continued

Examples 1 to 3, Comparative Examples 1b, 5 and 12
(Blends of (A) and of semicrystalline PEBAs (Ba))

|  | Comparative 12 | Example 1 | Example 2 | Example 3 | Comparative 5 | Comparative 1b |
|---|---|---|---|---|---|---|
| Tg (reflection of the temperature stability) (determined by DMA, peak tangent delta) | 95 | 95 | 95 | 95 |  | <50 |
| E' at 23° C. in MPa (by DMA), flexibility | 690 | 560 | 430 | 350 | 150 | 460 |
| Ross-Flex fatigue behaviour (cycles) | 20000 | 100000 | 130000 | >150000 | >150000 | 50000 |
| Ability to be injection moulded | 151 | 177 |  |  |  |  |
| Notched Charpy impact ISO179 | breaking | Non-breaking |  |  |  |  |

TABLE 6

Examples 4 to 6, Comparative Examples 14 and 15
(Blends of (A) and of semicrystalline PAs (Bb))

|  | Comparative 14 | Example 4 | Example 5 | Example 6 | Comparative 15 |
|---|---|---|---|---|---|
| Composition |  |  |  |  |  |
| PA11 BESHVO | 100 | 95 | 75 | 30 |  |
| Test 2 |  | 5 | 25 | 70 | 100 |
| Properties |  |  |  |  |  |
| Transmission at 560 nm over 2 mm | 44 | 54 | 69 | 81 | 91 |
| ESC Ethanol |  |  |  | 100 | 91 |

TABLE 7

Comparative Example 1B and Example A others (blends
of (A) and of semicrystalline PEBAs (Ba))

|  | Comparative Example 1B | Example A |
|---|---|---|
| Composition |  |  |
| PEBA 12/PTMG 5000/650 | 100 | 75 |
| Test 2 |  | 25 |
| Properties |  |  |
| Transmission at 560 nm over 2 mm | 23 | 75 |

TABLE 8

Example 7 (Antistatic and waterproof-breathable blend)

|  | Example 7 |
|---|---|
| Composition |  |
| PEBA 12/PEG 4500/1500 | 30 |
| Test 7 | 70 |
| Properties |  |
| Surface resistivity (antistatic effect) | 9 × 10$^9$ |
| Permeability to water vapour (waterproofness-breathability) | 7500 |
| Transmission at 560 nm | 66 |

TABLE 9

Ternary blend, Example 8

|  | Example 8 |
|---|---|
| Composition |  |
| Test 2 | 50 |
| PEBA 12/PTMG 4000/1000 | 30 |
| PA11 BESHVO | 20 |
| Properties |  |
| Transmission at 560 nm | 81 |

TABLE 10

Example 9

|  | Example 9 |
|---|---|
| Composition |  |
| Test 3 | 15 |
| Ref. 1 | 15 |
| PA11 BESHVO | 70 |
| Properties |  |
| Transmission at 560 nm | 71 |

If it is desired to contribute better impact strength and better chemical resistance to the transparent amorphous polyamide (BMACM.14), consideration may also be given to compositions illustrated by the following examples. Test 2 will give flexibility and impact strength, while PACM45.14 will contribute, by virtue of its crystallinity, chemical resistance.

TABLE 11

Examples 10 and 11

| Composition | Example 10 | Example 11 |
|---|---|---|
| Test 2 | 30 | 30 |
| Ref. 1 | 70 | 50 |
| Ref. 2 |  | 20 |
| Properties |  |  |
| Transmission at 560 nm | 82 | 75 |

If, with respect to Example 3, a reduced flexibility is desired while retaining most of the elasticity properties (Ross-Flex), it is preferable not to take a less flexible and thus polyether-poor PEBA but instead to retain the same flexible and polyether-rich PEBA 2000/1000 and to reduce the flexibility by introducing a small amount of rigid amorphous PA.

TABLE 12

Example D

|  | Example D |
|---|---|
| Composition |  |
| Test 3 | 30 |
| Ref. 1 | 10 |
| PEBA 12/PTMG 2000/1000 | 60 |
| Properties |  |
| Transmission at 560 nm | 56 |

It is also possible to use a semicrystalline aliphatic PA in place of the amorphous PA, which will have the advantage of improving the chemical resistance.

TABLE 13

Examples E and F

|  | Example E | Example F |
|---|---|---|
| Composition |  |  |
| Test 3 | 30 | 30 |
| PA11 BESHVO | 10 | 50 |
| PEBA 12/PTMG 2000/1000 | 60 | 20 |
| Properties |  |  |
| Transmission at 560 nm | 66 | 55 |

The invention claimed is:

1. Transparent blend or alloy comprising, by weight, the total being 100%:
   (A) 1 to 99% of at least one constituent copolymer:
      exhibiting a high transparency such that the transmission at 560 nm through a sheet with a thickness of 2 mm is greater than 65%;
      exhibiting a glass transition temperature of at least 90° C.; and
      being amorphous or exhibiting a crystallinity ranging up to semicrystallinity; and
      comprising:
         (A1) amide units, including amide units produced from at least one cycloaliphatic diamine unit; and
         (A2) flexible ether units;
   (B) 99 to 1% of at least one constituent polymer chosen from:
      (Ba) semicrystalline copolyamides comprising amide units (Ba1) and comprising ether units (Ba2), wherein said semicrystalline copolyamides have a glass transition temperature (Tg) of less than 65° C.; and
      alloys based on such copolyamides (Ba); and
   (C) 0 to 50% by weight of at least one polyamide, copolyamide, or copolyamide comprising ether units other than those used in (A) and (B) above; and/or of at least one additive normal for thermoplastic polymers and copolymers;
   the choice of the units or monomers in the composition of (A), (B) and (C) and also the choice of the proportions of the said units or of the said monomers being such that the resulting blend or alloy exhibits a high transparency such that the transmission at 560 nm through a sheet with a thickness of 2 mm is greater than 50%.

2. Blend or alloy according to claim 1, wherein the constituent copolymer (A) is amorphous.

3. Blend or alloy according to claim 1, wherein the constituent copolymer (A) is quasiamorphous, having a crystallinity such that the enthalpy of fusion during the second heating of an ISO DSC (delta Hm(2)) is less than or equal to 10 J/g.

4. Blend or alloy according to claim 1, wherein the constituent copolymer (A) has a crystallinity such that the enthalpy of fusion during the second heating of an ISO DSC (delta Hm(2)) is between 10 and 30 J/g.

5. Blend or alloy according to claim 1, wherein the constituent copolymer (A) exhibits a transparency which is such that the transmission at 560 nm through a sheet with a thickness of 2 mm is greater than 75%.

6. Blend or alloy according to claim 1, wherein the constituent copolymer (A) comprising amide units (A1) and comprising ether units (A2) is provided in the form of polyamide-polyether blocks.

7. Blend or alloy according to claim 6, wherein the polyamide blocks of the polyamide-polyether blocks of copolymer (A) are chosen from BMACM.6, BMACM.9, BMACM.10, BMACM.12, BMACM.14, BMACM.16, BMACM.18 and their blends or copolymers, wherein BMACM means bis(3-methyl-4-aminocyclohexyl)methane.

8. Blend or alloy according to claim 6, wherein the number-average molecular weight of the polyamide blocks is between 500 and 12 000 g/mol.

9. Blend or alloy according to claim 6, wherein the ether units (A2) result from at least one polyalkylene ether polyol.

10. Blend or alloy according to claim 9, wherein the polyalkylene ether polyol is selected from the group consisting of polyethylene glycol (PEG), polypropylene glycol (PPG), polytrimethylene glycol (PO3G), polytetramethylene glycol (PTMG), their blends and their copolymers.

11. Blend or alloy according to claim 6, wherein the flexible polyether blocks comprise polyoxyalkylene sequences comprising $NH_2$ chain ends.

12. Blend or alloy according to claim 6, wherein the number-average molecular weight of the polyether blocks is between 200 and 4000 g/mol.

13. Blend or alloy according to claim 6, wherein the copolyamides (Ba) are chosen from those having a melting point of greater than 100° C., and a glass transition temperature (Tg) of less than 65° C. and comprising:
   (Ba1) aliphatic or predominantly aliphatic amide units; and
   (Ba2) ether units.

14. Blend or alloy according to claim 13, wherein the copolyamide (Ba) comprising amide units (Ba1) and comprising ether units (Ba2) is provided in the form of polyamide-polyether blocks.

15. Blend or alloy according to claim 6, wherein the amide units (Ba1) are composed predominantly of a lactam or of an α,ω-aminocarboxylic acid and/or of an equimolar combination of at least one diamine and of at least one dicarboxylic acid, the diamine or diamines being predominantly linear aliphatic diamines, wherein the amide units optionally comprise at least one other polyamide comonomer.

16. Blend or alloy according to claim 6, wherein the constituent copolymer (B) includes amide units (Ba1) of linear aliphatic nature for which the number of carbons per amide is on average at least equal to 9.

17. Blend or alloy according to claim 6, wherein the linear aliphatic polyamide blocks are chosen from the group consisting of PA 12, PA 11, PA 10.10, PA 10.12, PA 10.14, PA 6.10, PA 6.12, PA 6.14 and PA 6.18.

18. Blend or alloy according to claim 6, wherein the copolyamide (Ba) has a crystallinity such that the enthalpy of fusion during the second heating of an ISO DSC (delta Hm(2)) is at least equal to 25 J/g.

19. Blend or alloy according to claim 1, wherein the amide units (A1) represent at least 50% by weight of the said constituent copolymer (A) and wherein the amide units (Ba1) represent at least 50% by weight of the copolyamide (Ba).

20. Blend or alloy according to claim 1, wherein the amide units (A1) are composed predominantly of an equimolar combination of at least one diamine and of at least one dicarboxylic acid, the diamine or diamines being predominantly cycloaliphatic and the dicarboxylic acid or acids being predominantly linear aliphatic, wherein the amide units optionally comprise at least one other polyamide comonomer.

21. Blend or alloy according to claim 20, wherein the aliphatic dicarboxylic acid or acids are chosen from aliphatic dicarboxylic acids having from 6 to 36 carbon atoms.

22. Blend or alloy according to claim 20, wherein at least one nonaliphatic dicarboxylic acid is in the composition of the monomers of the amide units in a proportion of at most 15 mol % with respect to the dicarboxylic acids of the said composition.

23. Blend or alloy according to claim 22, wherein the nonaliphatic dicarboxylic acid is selected from the group consisting of aromatic diacids, isophthalic acid (I), terephthalic acid (T) and their mixtures.

24. Blend or alloy according to claim 20, wherein the monomer or monomers optionally in the composition of the monomers of the amide units (A1) are chosen from lactams and α,ω-aminocarboxylic acids.

25. Blend or alloy according to claim 24, wherein the lactams are chosen from the group consisting of lactams having at least 6 carbons, caprolactam, oenantholactam and lauryllactam.

26. Blend or alloy according to claim 24, wherein the α,ωaminocarboxylic acid are chosen from those having at least 6 carbons, aminocaproic acid, 7-aminoheptanoic acid, 11-aminoundecanoic acid and 12-aminododecanoic acid.

27. Blend or alloy according to claim 20, wherein the cycloaliphatic diamine or diamines are chosen the group consisting of bis(3-methyl-4-aminocyclohexyl)methane (BMACM), para-aminodicyclohexylmethane (PACM), isophoronediamine (IPD), bis(4-aminocyclohexyl)methane (BACM), 2,2-bis(3-methyl-4-aminocyclohexyl)propane (BMACP), and 2,6-bis(aminomethyl)norbornane (BAMN).

28. Blend or alloy according to claim 27, wherein just one cycloaliphatic diamine, was used as diamine to produce the amide units (A1).

29. Blend or alloy according to claim 27, wherein at least one noncycloaliphatic diamine is in the composition of the monomers of the amide units (A1) in a proportion of at most 30 mol % with respect to the diamines of the said composition, the said noncycloaliphatic diamine being a linear aliphatic diamine, selected from the group consisting of 1,4-tetramethylenediamine, 1,6-hexamethylenediamine, 1,9-nonamethylenediamine and 1,10-decamethylenediamine.

30. Blend or alloy according to claim 1, wherein the constituent copolymer (A) includes amide units (A1) for which the number of carbons per amide is on average at least equal to 9.

31. Blend or alloy according to claim 1, wherein the ether units (A2) represent at least 15% by weight of the said constituent copolymer (A) and wherein the ether units (Ba2) represent at least 15% by weight of the copolyamide (Ba).

32. Blend or alloy according to claim 1, wherein the additive or additives are selected from the group consisting of colorants, stabilizers, heat stabilizers, UV stabilizers, nucleating agents, plasticizers, agents for improving the impact strength and reinforcing agents, the said additive or additives having a refractive index similar to that of the copolymer (A), or (B).

33. Blend or alloy according to claim 1, wherein the nature and the proportions of (A) and of (B) and, if appropriate, of a constituent polymer of (C) are such that the resulting composition is amorphous and has a glass transition temperature of greater than 75° C.

34. Blend or alloy according to claim 1, wherein the nature and the proportions of (A) and (B) and, if appropriate, of a constituent polymer of (C) are such that the resulting composition is semicrystalline, with a melting point M.p. of greater than 100° C., and with an enthalpy of fusion during the second heating of an ISO DSC (delta Hm(2)) of greater than 10 J/g, in order to guarantee sufficient crystallinity to remain in a sufficiently solid state above the glass transition temperature (Tg) and to liquefy only above its melting point M.p.

35. Blend or alloy according to claim 1, wherein the choice of the units or monomers participating in the composition of (A), (B) and (C) as well as the choice of the proportions of the said units or of the said monomers are such that the resulting blend or alloy exhibits a high transparency such that the transmission at 560 nm through a sheet with a thickness of 2 mm is greater than 75%.

36. Blend or alloy according to claim 1, wherein, the ether units (Ba2) are flexible ether units, and wherein said flexible ether units in (Ba2) or (A2) are chosen to be of highly hydrophilic nature, which confers antistatic properties and waterproof-breathable properties, that is to say allowing the passage of water vapour but not of liquid water, on the said blend or alloy, wherein this blend or alloy optionally further comprises third-party antistatic additives, in order to reinforce the overall antistatic effect, and/or additives which make it possible to increase the blending compatibility with other polymers, wherein the blend or alloy, alone or in combination with additives, is useful as additive of another polymer or material in order to confer on it an increase in antistatic or waterproof-breathable properties.

37. Blend or alloy according to claim 36, wherein the blend or alloy, alone or in combination with additives, is transparent, the ingredients of the said blend or alloy being chosen so that the refractive index of the latter is very close to that of the polymer or material to which the blend or alloy is to be added.

38. Shaped transparent or translucent article, selected from the group consisting of fibre, fabric, film, sheet, rod, pipe or injection-moulded component, which can be produced in the form of a dry blend or after a compounding in an extruder, comprising, by weight, the total being 100%:
- (A) 1 to 99% of at least one constituent copolymer:
    - exhibiting a high transparency such that the transmission at 560 nm through a sheet with a thickness of 2 mm is greater than 65%;
    - exhibiting a glass transition temperature of at least 75° C.; and
    - being amorphous or exhibiting a crystallinity ranging up to semicrystallinity; and
    - comprising:
        - (A1) amide units, including at least one cycloaliphatic unit; and
        - (A2) flexible ether units;
- (B) 99 to 1% of at least one constituent polymer chosen from:
    - (Ba) semicrystalline copolyamides comprising amide units (Ba1) and comprising ether units (Ba2) having a glass transition temperature (Tg) of less than 65° C.; and
    - alloys based on such copolyamides; and
- (C) 0 to 50% by weight of at least one polyamide, copolyamide, copolyamide comprising ether units or alloy based on such polyamides or copolyamides other than those used in (A) and (B) above; and/or of at least one additive normal for thermoplastic polymers and copolymers;

the choice of the units or monomers in the composition of (A), (B) and (C) and also the choice of the proportions of the said units or of the said monomers being such that the resulting blend or alloy exhibits a high transparency such that the transmission at 560 nm through a sheet with a thickness of 2 mm is greater than 50%.

39. Shaped article according to claim 38, wherein said shaped article consists of an item of sports equipment or a component of an item of sports equipment, selected from the group consisting of sports shoes, sports gear, ice skates, ski bindings, rackets, sports bats, boards, horseshoes, flippers, golf balls, a recreational article, equipment subjected to attacks by the weather and to mechanical assaults, a protective article, a helmet, visors, glasses, sides of glasses, a headlight protector, rearview mirror, small component of all-terrain motor vehicles, and tanks of mopeds, motorbikes, and scooters.

* * * * *